UNITED STATES PATENT OFFICE.

WILLIAM HEDLEY, OF MEDINA, NEW YORK.

IMPROVEMENT IN COMPOSITIONS FOR ARTIFICIAL STONE.

Specification forming part of Letters Patent No. 136,160, dated February 25, 1873.

*To all whom it may concern:*

Be it known that I, WILLIAM HEDLEY, of Medina, in the county of Orleans and State of New York, have invented a new and useful Improvement in Compositions for Artificial Stone; and I hereby declare that the following is a full and exact description of the same.

I use Portland cement, sand, litharge, alum, and sulphate of iron, in certain proportions hereinafter named, which, after many experiments, I have found to produce a very superior article of artificial stone, which will resist the injurious effects of frost and humidity.

Of the ingredients, making in the aggregate one hundred pounds, sand constitutes sixty-four parts; Portland cement, thirty-five parts; litharge, one-half of one part; alum, one-fourth of one part; and sulphate of iron, one-fourth of one part. To these ingredients any suitable coloring material may be added, as may be desired. The quantities of alum and of sulphate of iron may, under certain conditions, be varied, the effect of the alum being to intensify the hydraulic properties of the cement, and consequently produce in the article greater hardness; and the sulphate of iron, in combining with the cement, produces a gypsum, corroding, coloring, and hardening the product. The use of the litharge is beneficial in causing increased density and hardness.

It is evident that the proportions of the several ingredients may be slightly varied without essentially affecting the result; and this may be necessary to meet the varying conditions or grades of sand which is used; also in view of the different uses to which the artificial stone is to be applied.

My process of preparing the ingredients and forming them in mass is as follows: The sand, cement, and litharge are first thoroughly mixed together; then the alum and sulphate of iron are dissolved in water at about the boiling temperature, and this solution is then to be thoroughly mixed and incorporated in the mass of sand, cement, and litharge.

Preparatory to molding in any suitable molds of desired form the entire mass is to be dampened by such a quantity of water as will cause the cementing action, yet not sufficiently wet to prevent the mass from remaining in an open granular condition. During the dampening process the whole mass should be continually stirred and agitated to cause the ingredients to be thoroughly commingled, and at the same time to obtain the open granular condition preparatory to molding. While the molds are being filled with this prepared composition the workmen will employ suitable pounders to condense the mass within the molds.

My improved artificial stone is designed for use where ornamental trimmings for buildings are commonly employed, as well as for paving and analogous purposes.

The water necessary to dampen the mass for molding may be added to the solution of the alum and sulphate of iron before mixing those ingredients into the mass.

Having fully described my improved artificial stone, I claim and desire to secure by Letters Patent—

The composition for artificial stone, consisting of the parts and in the proportions specified, prepared by the process substantially as described, for the purposes specified.

In testimony hereof I have hereto set my hand this 29th day of February, A. D. 1872.

WILLIAM HEDLEY.

Witnesses:
A. C. PARSONS,
H. P. K. PECK.